(12) United States Patent
Mueller et al.

(10) Patent No.: US 8,527,900 B2
(45) Date of Patent: Sep. 3, 2013

(54) MOTOR VEHICLE

(75) Inventors: Ulrich Mueller, Ingolstadt (DE); Marco Lobato, Palo Alto, CA (US); Korina Loumidi, Palo Alto, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 153 days.

(21) Appl. No.: 12/840,890

(22) Filed: Jul. 21, 2010

(65) Prior Publication Data

US 2012/0023440 A1 Jan. 26, 2012

(51) Int. Cl.
*G06F 3/048* (2013.01)

(52) U.S. Cl.
USPC ............................ 715/784; 715/810; 715/830

(58) Field of Classification Search
USPC .......................................... 715/784, 810, 830
See application file for complete search history.

(56) References Cited

U.S. PATENT DOCUMENTS

| | | | |
|---|---|---|---|
| 6,175,782 B1 * | 1/2001 | Obradovich et al. | 701/1 |
| 6,275,231 B1 * | 8/2001 | Obradovich | 345/156 |
| 6,636,197 B1 * | 10/2003 | Goldenberg et al. | 345/156 |
| 7,126,583 B1 * | 10/2006 | Breed | 345/158 |
| 7,499,040 B2 * | 3/2009 | Zadesky et al. | 345/204 |
| 7,589,717 B2 * | 9/2009 | Gregorio et al. | 345/184 |
| 7,804,487 B1 * | 9/2010 | Acampora et al. | 345/169 |
| 8,201,100 B2 * | 6/2012 | Price et al. | 715/784 |
| 2006/0026521 A1 * | 2/2006 | Hotelling et al. | 715/702 |
| 2006/0250377 A1 | 11/2006 | Zadesky et al. | |
| 2007/0120830 A1 * | 5/2007 | Kammerer | 345/173 |
| 2007/0185631 A1 * | 8/2007 | Yeh et al. | 701/36 |
| 2007/0236470 A1 | 10/2007 | Abanami et al. | |
| 2009/0085880 A1 * | 4/2009 | Vitale et al. | 345/173 |
| 2011/0040455 A1 | 2/2011 | Lathrop et al. | |

FOREIGN PATENT DOCUMENTS

| | | |
|---|---|---|
| DE | 20020227 U1 | 4/2001 |
| DE | 10139693 A1 | 5/2002 |
| DE | 10334218 A1 | 2/2005 |
| DE | 10341016 A1 | 3/2005 |
| DE | 102006019065 A1 | 10/2007 |
| DE | 102006024252 A1 | 1/2008 |
| DE | 102008005907 A1 | 8/2009 |
| DE | 102008035907 A1 | 2/2010 |
| DE | 102010005483 A1 | 8/2010 |
| DE | 102009056185 A1 | 6/2011 |
| EP | 0366132 | 5/1990 |
| EP | 1691263 A1 | 8/2006 |
| EP | 1764674 A2 | 3/2007 |
| WO | 9509402 A2 | 4/1995 |
| WO | 2005025942 A2 | 3/2005 |

OTHER PUBLICATIONS

BMW, BMW 7 Series Owner's Manual, Feb. 2007, BMW AG, pp. 1-249, see pp. 16-19, 130-145.*

(Continued)

*Primary Examiner* — David Phantana Angkool
(74) *Attorney, Agent, or Firm* — Barnes & Thornburg LLP

(57) ABSTRACT

The invention relates to a motor vehicle having an operator control element for the operator control of a function of the motor vehicle, wherein the operator control element comprises an upwardly directed surface having a touchpad for the operator control of at least a first function of the motor vehicle, and wherein the operator control element can be displaced in one direction essentially parallel to the upwardly directed surface for the purpose of operator control of at least a second function of the motor vehicle.

41 Claims, 8 Drawing Sheets

(56) References Cited

OTHER PUBLICATIONS

U.S. Appl. No. 12/699,689; Feb. 3, 2010 (now abandoned).

U.S. Appl. No. 61/149,523; Feb. 3, 2009 (now expired).

Search Report for German Patent Application No. 10 2011 107 011.0; Feb. 10, 2012.

* cited by examiner

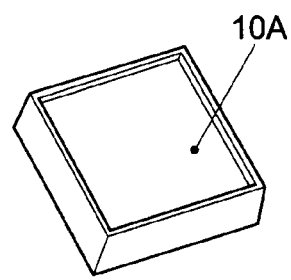
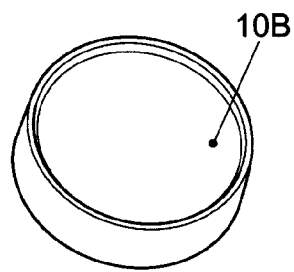
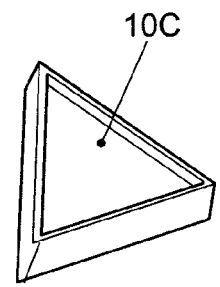
FIG. 4  FIG. 5  FIG. 6
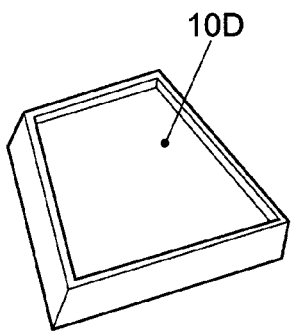
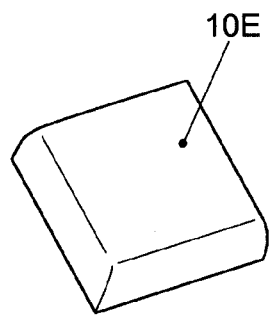
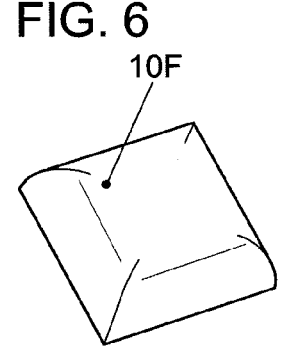
FIG. 7  FIG. 8  FIG. 9
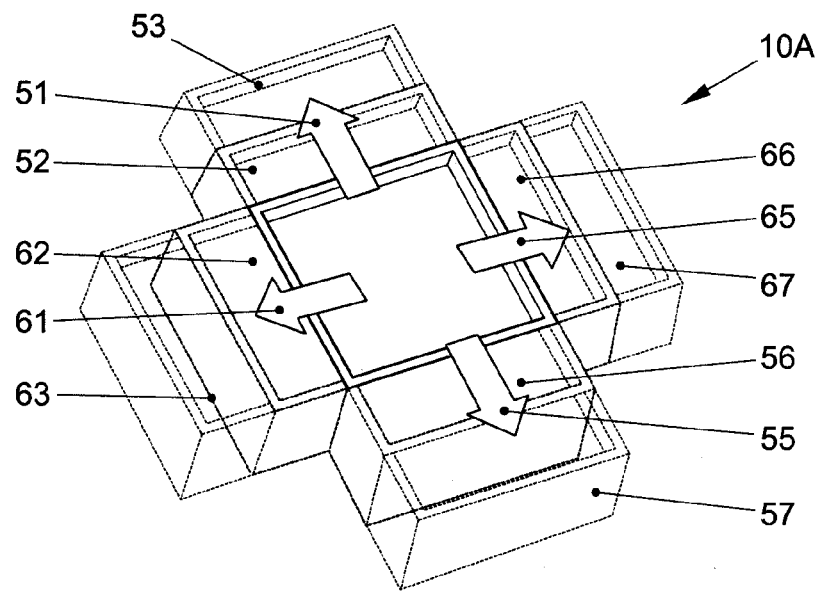
FIG. 10

MOTOR VEHICLE

BACKGROUND TO THE INVENTION

The invention relates to a motor vehicle having an operator control element for the operator control of a function of the motor vehicle, wherein the operator control element comprises an upwardly directed surface having a touchpad for the operator control of at least a first function of the motor vehicle.

In line with DE 101 39 693 A1, modern electronic devices in a vehicle, which are continually providing additional functions having more and more options, have been provided with multifunctional operator control elements, which can be used for the operator control of various functions of the connected devices, on account of the installation space for the associated operator control elements being limited. By way of example, EP 0 366 132 B1 thus discloses a multifunctional operator control device for motor vehicles which involves functional groups and individual functions being selected using a rotary switch, and which involves an ENTER function being able to be initiated, wherein one and the same bidirectional rotary switch is used for menu selection and individual function selection.

DE 200 20 227 U1 discloses a vehicle steering wheel having two operator control elements affixed to the steering wheel for the control of vehicle functions in a vehicle, wherein the operator control elements each comprise a touch-sensitive sensor area which produces an electronic signal when touched.

U.S. patent application 61/149,523 describes a motor vehicle having a steering wheel, wherein the motor vehicle comprises a first display integrated in the steering wheel for variably presenting information, a first touchscreen arranged above the first display for the input of commands, a second display integrated in the steering wheel so as to be physically separate from the first display for variably presenting information, and a second touchscreen arranged above the second display for the input of commands.

U.S. patent application Ser. No. 12/699,689 describes a motor vehicle having a steering wheel, wherein the motor vehicle comprises a first display integrated in the steering wheel for variably presenting information, a first touchscreen arranged above the first display for the input of commands, a second display integrated in the steering wheel so as to be physically separate from the first display for variably presenting information, and a second touchscreen arranged above the second display for the input of commands.

DE 10 2006 024 252 A1 discloses a vehicle cockpit having a vehicle steering wheel which has a steering wheel exterior surface which is accessible to a user, wherein the steering wheel is in a form such that it can be used to sense finger movements on the steering wheel exterior surface, with an evaluation circuit being provided for generating evaluation signals which, as such, are related to the finger movement and the position of the finger on the steering wheel.

DE 10 2006 019 065 A1 discloses an input interface for a vehicle cockpit which, as such, comprises a gearshift, wherein the gearshift has a knob which forms a finger support surface, with a sensing device being provided for generating an output signal according to the position of a finger on the finger support surface.

WO 2005/025942 A2 discloses a capacitive touch sensor in a motor vehicle.

DE 103 41 016 A1 discloses a rotary/push control having an annular rotary encoder, which has an inner ring and a rotary ring, which can rotate around the inner ring about an axis, with a handle and which is arranged so as to be able to be displaced linearly along the axis relative to a housing, and having a touchpad which is arranged in an interior of the annular rotary encoder and can be displaced linearly along the axis together with the annular rotary encoder relative to the housing, wherein the linear displacement of the handle and/or of the touchpad allows a pushbutton switch function to be initiated.

It is an object of the invention to improve or simplify the operator control of a motor vehicle. In this case, it is particularly desirable that the driver is distracted as little as possible from what is happening in the traffic even during the operator control of complex devices. Operator control of a motor vehicle should be able to be effected very quickly, in particular.

SUMMARY OF THE INVENTION

The aforementioned object is achieved by a motor vehicle having an operator control element for the operator control of functions of the motor vehicle, wherein the operator control element comprises an upwardly directed surface having a touchpad for the operator control of at least a first function of the motor vehicle or comprises a touchpad for the operator control of at least a first function of the motor vehicle, and wherein the operator control element can be displaced (in one direction), particularly essentially parallel to the upwardly directed surface or essentially parallel to the position of the touchpad, for the purpose of operator control of at least a second function (which is different from the first function of the motor vehicle, in particular) of the motor vehicle.

Within the context of the invention, a touchpad is a (e.g. resistive or capacitive) touch-sensitive area, in particular. A touchpad is particularly a touchscreen within the context of the invention. A touchpad may have a display arranged beneath it. However, provision is made, in particular, for the touchpad to have no display arranged beneath it. Within the context of the invention, a touchpad is nontransparent, in particular. Within the context of the invention, a touchpad is opaque, in particular. A touchpad within the context of the invention may be an optical joystick. An optical joystick features on the Sony Ericsson XPERIA X1 mobile telephone, for example.

An exemplary embodiment of an upwardly directed surface is shown in FIG. 2, in which the touchpad denoted by reference symbol 11 covers the upwardly directed surface of the operator control element denoted by reference symbol 10. An upwardly directed surface within the context of the invention may be inclined, in particular slightly. An upwardly directed surface within the context of the invention is particularly a surface of the operator control element which is opposite (an interior surface of) a hand of an operator.

An operator control element within the context of the invention cannot rotate about an axis, in particular. An operator control element within the context of the invention cannot rotate about an orthogonal line from the upwardly directed surface, in particular.

Within the context of the invention, a function of a motor vehicle is particularly the reception frequency of a radio, the volume of an audible output in the motor vehicle, a sound setting (nature and balance), a map detail selection, a title selection, a destination selection and/or a temperature setting. A function of a motor vehicle within the context of the invention is particularly a function for which a target value needs to be selected from a selection of, in particular continuous, values. A function of a motor vehicle within the context of the invention is particularly a function which can be adjusted in analog fashion, particularly following a scale. In one advantageous refinement of the invention, the function of the motor vehicle comprises scrolling through a list. In another advantageous refinement of the invention, the function of the motor vehicle comprises displacing a map detail. In another advantageous refinement of the invention, the function of the motor vehicle comprises scaling a map detail. In another advantageous refinement of the invention, the function of the motor vehicle comprises displacing an element presented on the display.

One first function of the motor vehicle within the context of the invention comprises script input, in particular. One first function of the motor vehicle within the context of the invention comprises particularly the displacement of windows and/or map displays and/or sliders which are presented or indicated by means of a display in the motor vehicle. A (virtual) slider of this kind can be used for setting tones and/or volumes, for example. One first function of the motor vehicle within the context of the invention particularly does not comprise navigation through menu levels. One first function of the motor vehicle within the context of the invention particularly does not comprise scrolling through lists indicated by means of a display in the motor vehicle.

One second function of the motor vehicle within the context of the invention comprises particularly scrolling through a list which is indicated, particularly by means of a display. A list within the context of the invention may particularly comprise alphanumeric characters and/or graphical symbols or icons. One second function of the motor vehicle within the context of the invention particularly-also comprises the closing and opening of windows which are presented by means of a display in the motor vehicle.

In one refinement of the invention, displacing the operator control element by a first distance allows operator control of the second function of the motor vehicle, and displacing the operator control element by a second distance allows operator control of at least a third function of the motor vehicle (which is different from the second function of the motor vehicle, in particular), the second distance being greater than the first distance. One third function of the motor vehicle within the context of the invention comprises rapid scrolling through list entries, in particular.

In a further refinement of the invention, the motor vehicle also comprises a display which is physically separate from the operator control element. A display within the context of the invention may be a head-up display, for example. A display within the context of the invention is particularly a display arranged in a combination instrument for the variable presentation of information. Such a display may be arranged between two analog instruments in the combination instrument, for example. One exemplary embodiment of a display within the context of the invention may particularly also be the display denoted by reference symbol in the description of the figures. A display within the context of the invention is in particular a TFT or a TFT-like display.

In a further refinement of the invention, the second function of the motor vehicle comprises a jump from a marked list entry presented by means of the display to an adjacent list entry presented by means of the display. In a further refinement of the invention, the third function of the motor vehicle comprises scrolling through a list presented by means of the display. In a further refinement of the invention, the speed of scrolling through the list presented by means of the display is dependent on the second distance.

In a further refinement of the invention, the first function of the motor vehicle can be indicated by means of the display.

In a further refinement of the invention, the motor vehicle comprises a controller for producing haptic feedback when the first distance is exceeded and/or for producing haptic feedback when a list entry in the list is reached. Alternatively or in addition, appropriate audible feedback may also be provided.

In a further refinement of the invention, the operator control element can be displaced in another direction essentially parallel to the upwardly directed surface for the purpose of operator control of at least a fourth function of the motor vehicle (which is different from the first function of the motor vehicle and the second function of the motor vehicle and the third function of the motor vehicle, in particular). In this case, provision is made, in particular, for the direction and the other direction to have a different orientation. In particular, provision is made for the direction and the other direction to run essentially orthogonally relative to one another. In a further refinement of the invention, the operator control element can be displaced in (at least) four directions for the purpose of operator control of different functions of the motor vehicle, provision particularly being made for two respective directions to have the same orientation. In this case, two directions which have the same orientation are particularly a direction and the opposite direction.

In a further refinement of the invention, the operator control element can be displaced in another direction essentially parallel to the upwardly directed surface for the purpose of operator control of at least a third function of the motor vehicle (which is different from the first function of the motor vehicle and the second function of the motor vehicle, in particular).

In a further refinement of the invention, the operator control element also comprises an edge which protrudes upward beyond the touchpad for the purpose of delimiting the touchpad.

The aforementioned object is also achieved by a method for the operator control of a or the motor vehicle with an or the operator control element, wherein the operator control element comprises an upwardly directed surface having a touchpad or comprises a touchpad, wherein the operator control of at least a first function of the motor vehicle is effected by touching the touchpad, and wherein the operator control of at least a second function of the motor vehicle (which is different from the first function of the motor vehicle, in particular) is effected by displacing the operator control element by a first distance (in one direction) essentially parallel to the upwardly directed surface or by a first distance essentially parallel to the position of the touchpad.

In one refinement of the invention, the operator control of a third function of the motor vehicle (which is different from the second function of the motor vehicle, in particular) is effected by displacing the operator control element by a second distance, the second distance being greater than the first distance.

In a further refinement of the invention, the motor vehicle also comprises a display which is physically separate from the operator control element. In a further refinement of the invention, the second function of the motor vehicle comprises a jump from a marked list entry presented by means of the display to an adjacent list entry presented by means of the display. In a further refinement of the invention, the third function of the motor vehicle comprises scrolling through a list presented by means of the display. In a further refinement of the invention, the speed of scrolling through the list presented by means of the display is dependent on the second distance.

In a further refinement of the invention, the first function of the motor vehicle is indicated by means of the display.

In a further refinement of the invention, haptic feedback is produced when the first distance is exceeded and/or when a list entry in the list is reached.

A motor vehicle within the context of the invention is particularly a land vehicle which can be used individually in road traffic. Motor vehicles within the context of the invention are particularly not limited to land vehicles with an internal combustion engine.

Further advantages and details can be found in the description of exemplary embodiments below.

BRIEF DESCRIPTION OF THE DRAWINGS

FIG. 4 shows an exemplary embodiment of an alternative refinement of the operator control element shown in FIG. 2;

FIG. 5 shows a further exemplary embodiment of an alternative refinement of the operator control element shown in FIG. 2;

FIG. 6 shows a further exemplary embodiment of an alternative refinement of the operator control element shown in FIG. 2;

FIG. 7 shows a further exemplary embodiment of an alternative refinement of the operator control element shown in FIG. 2;

FIG. 8 shows a further exemplary embodiment of an alternative refinement of the operator control element shown in FIG. 2;

FIG. 9 shows a further exemplary embodiment of an alternative refinement of the operator control element shown in FIG. 2;

FIG. 10 shows an exemplary embodiment of operator control positions of the operator control element shown in FIG. 4;

DETAILED DESCRIPTION OF PREFERRED EXEMPLARY EMBODIMENTS

Figure 1:
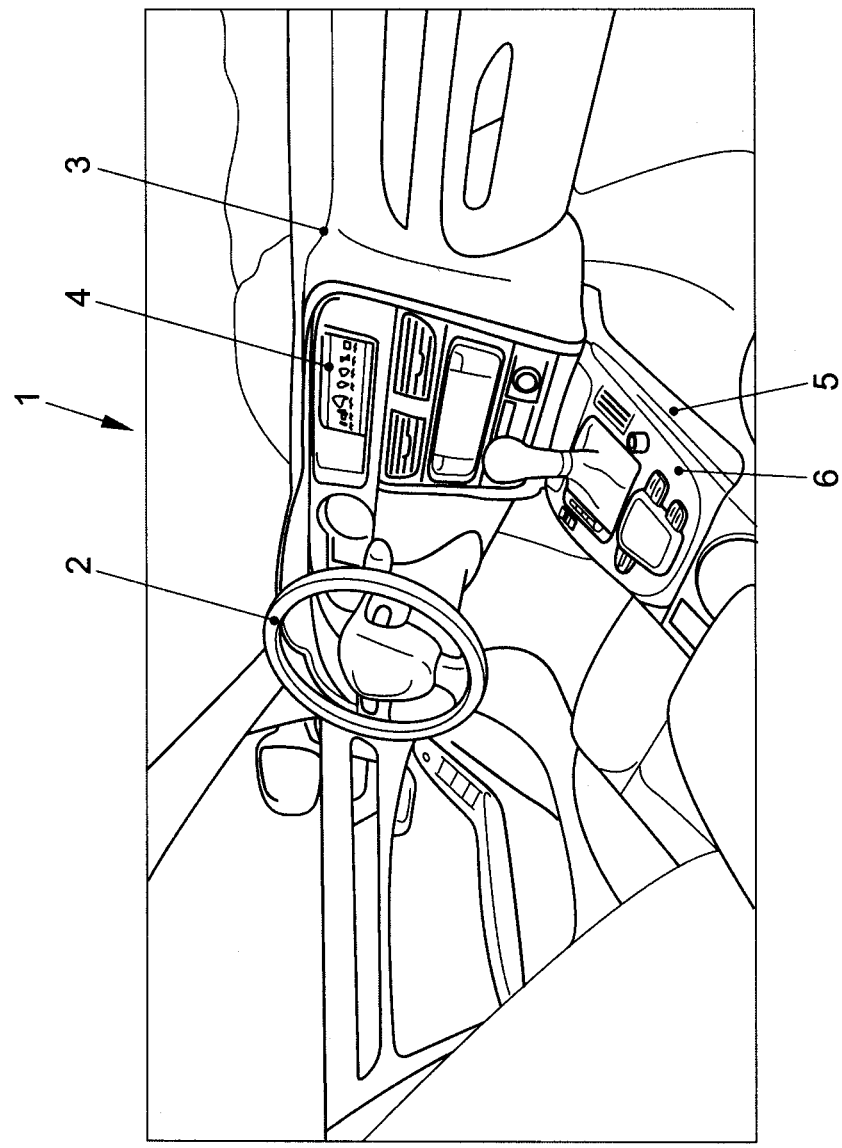
FIG. 1 shows details from an interior view of an exemplary embodiment of a motor vehicle.
Figure 2:
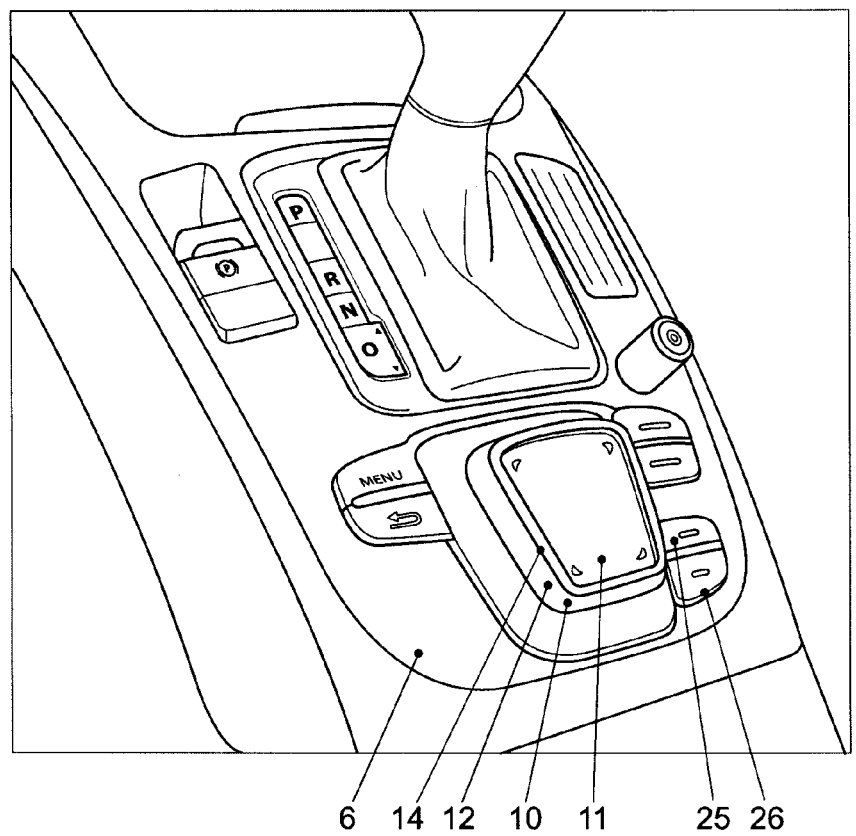
FIG. 2 shows an exemplary embodiment of an operator control cluster in the motor vehicle shown in FIG. 1 with an operator control element.
Figure 3:
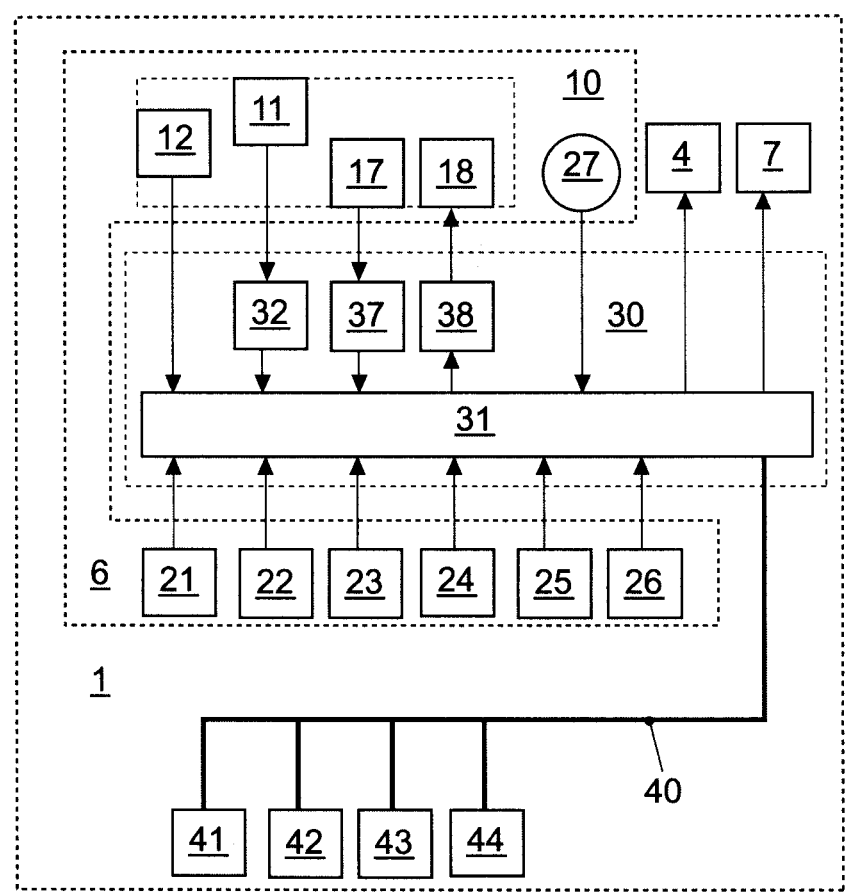
FIG. 3 shows a block diagram of the motor vehicle shown in FIG. 1.

FIG. 1 shows an exemplary embodiment of a motor vehicle 1—which is shown in a block diagram in FIG. 3. The motor vehicle 1 comprises a display 4 which is integrated in a dashboard 3 and which is arranged next to the steering wheel 2 of the motor vehicle 1 at the level of the steering wheel 2. In this case, the display 4 is arranged particularly in the region of the upper half of the steering wheel 2. For the purpose of operator control of the motor vehicle 1, the central console 5 of the motor vehicle contains an operator control cluster 6—which is shown in detail in FIG. 2.

The operator control cluster 6 comprises an operator control element 10 and also a tiltable rotary knob 27 which can be used to regulate a volume and, by tilting the rotary knob 27, to preselect a subsequent or preceding station or music title. The operator control cluster 6 also comprises a menu key 21, the operator control of which prompts a jump to a main selection menu. Furthermore, the operator control cluster 6 comprises a return key 22, the operator control of which prompts a return to the next highest menu. In addition, the operator control cluster 6 comprises basic menu keys 23, 24, 25 and 26 for calling a menu for the operator control of a navigation system 41 in the motor vehicle 1, an automatic climate control system 42 in the motor vehicle 1, an infotainment system 43 in the motor vehicle 1 or a telephone interface 44 in the motor vehicle 1.

The upwardly directed surface of the operator control element 10 comprises a touchpad 11 which is delimited by an upwardly protruding region 14 of the lateral edge 12 of the operator control element 10. The operator control element 10 is in a form such that it tapers rearward to some extent. However, there may also be alternative refinements provided, particularly refinements as shown in FIG. 4, FIG. 5, FIG. 6, FIG. 7, FIG. 8 and FIG. 9 and denoted by reference symbols 10A, 10B, 10C, 10D, 10E and 10F.

The motor vehicle 1 has a controller 30 which is connected by means of a bus system 40 to the navigation system 41, to the automatic climate control system 42, to the infotainment system 43 and to the telephone interface 44 and also possibly further functions or functional modules. The controller 30 has a control module 31 which can be used to drive the display 4 and a loudspeaker 7 and which can be used to evaluate operator control actions performed using the operator control element 10, using the menu key 21, using the return key 22, using the basic menu keys 23, 24, 25, 26 and using the rotary control 27, so that the display 4 or the loudspeaker 7 can be driven as appropriate or so that the navigation system 41, the automatic climate control system 42, the infotainment system 43 and the telephone interface 44 can be controlled by the operator as appropriate.

The operator control element 10 can be moved or displaced mechanically in four directions 51, 55, 61 and 65—as shown in FIG. 10 by way of example with the operator control element 10A. For the purpose of recognizing this displacement, the operator control element 10 or 10A has a displacement sensor system 17, the output signal from which is evaluated by means of an evaluation module 37 and transferred to the control module 31. Particularly the two directions 51 and 55 have two respective different functions associated with them in line with the magnitude of the displacement. Similarly, the directions 61 and 65 may also have two respective different functions associated with them in line with the magnitude of the displacement.

Figure 11:
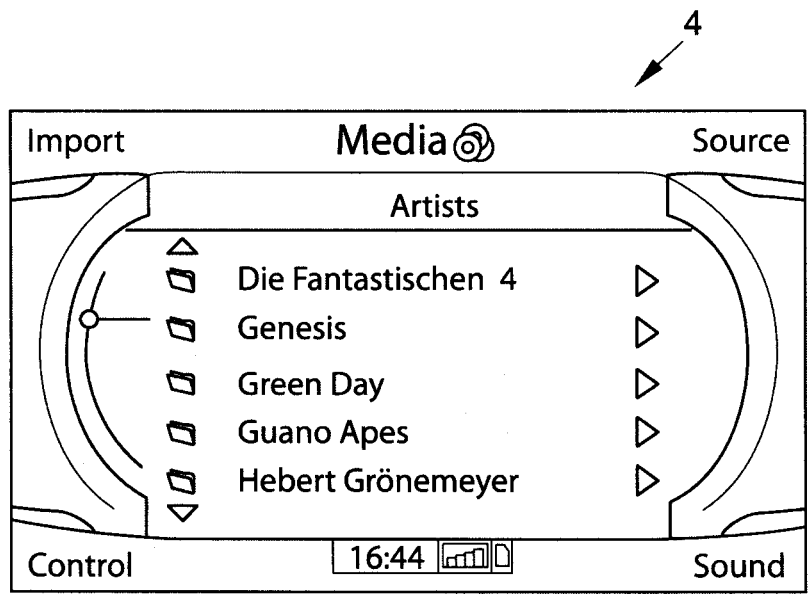
FIG. 11 shows an exemplary embodiment of an indication by means of a display in the motor vehicle shown in FIG. 1.

Provision is made for displacement of the operator control element 10 or 10A in direction 51 by a first distance, which is denoted by reference symbol 52, to preselect the next highest list entry in a list presented by means of the display 4. Such a list is shown in FIG. 11, for example. If the operator control element 10 or the operator control element 10A is displaced by the first distance 52 in direction 51, the selected "Genesis" entry changes to "Die Fantastischen 4". By contrast, if the operator control element 10 or the operator control element 10A is displaced by the first distance 56 in direction 55, the selected "Genesis" entry changes to "Green Day".

If the operator control element 10 or 10A is displaced by a second distance, denoted by reference symbol 53, in direction 51, the list shown in FIG. 11 is scrolled rapidly upward, with an actuator 18 in the operator control element 10 or 10A being used to produce haptic feedback. In this case, haptic feedback is first of all produced (click or production of a restoring force when the first distance is exceeded) when the first distance 52 is exceeded. Furthermore, displacement by the second distance 53 during scrolling involves the production of haptic feedback for each entry which is scrolled over (particularly vibration at an appropriate frequency). For the purpose of producing the haptic feedback or for the purpose of driving the actuator as appropriate, a haptic interface module 38 is provided.

If the operator control element 10 or 10A is displaced by a second distance, denoted by reference symbol 57, in direction 55, the list shown in FIG. 11 is scrolled rapidly downward, with the actuator 18 of the operator control element 10 or 10A likewise being used to produce haptic feedback. In this case, haptic feedback is first of all produced when the first distance 56 is exceeded. Furthermore, displacement by the second distance 57 during scrolling involves the production of haptic feedback for each entry which is scrolled over.

Figure 12:
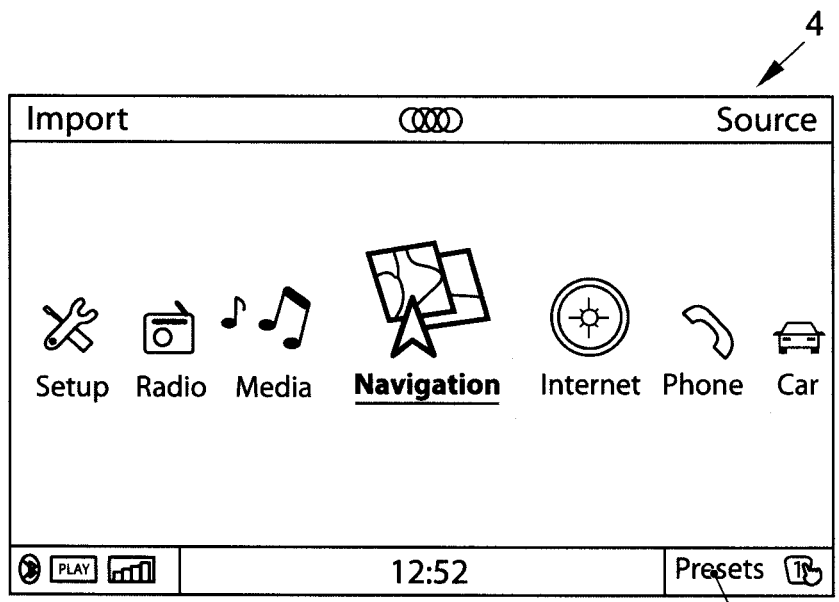
FIG. 12 shows a further exemplary embodiment of an indication by means of a display in the motor vehicle shown in FIG. 1.
Figure 13:
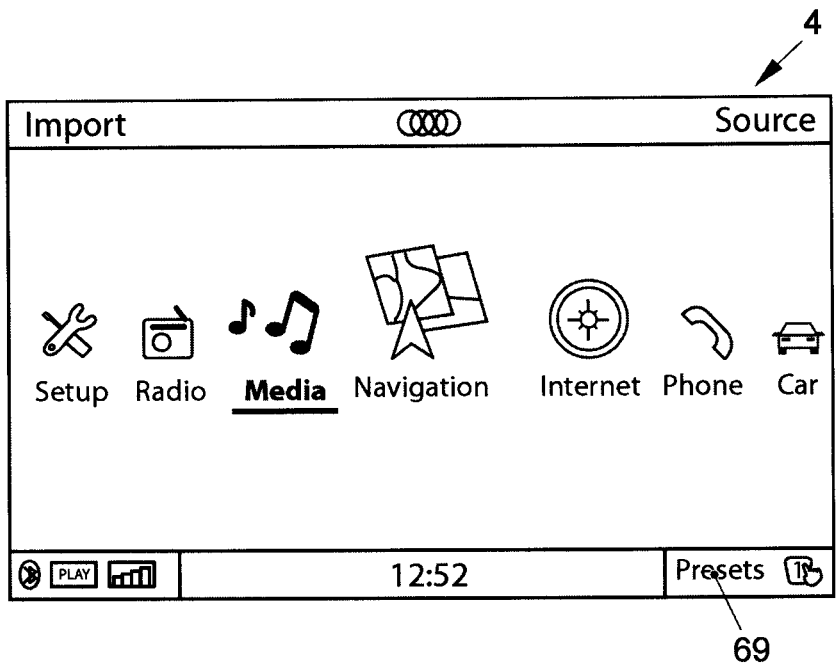
FIG. 13 shows a further exemplary embodiment of an indication by means of a display in the motor vehicle shown in FIG. 1.
Figure 14:
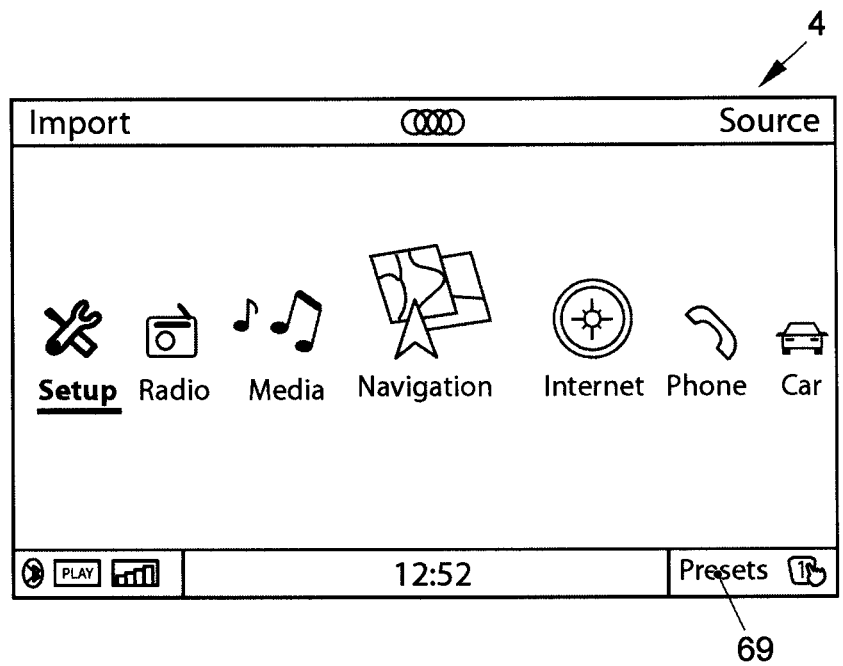
FIG. 14 shows a further exemplary embodiment of an indication by means of a display in the motor vehicle shown in FIG. 1.

Provision is made for displacement of the operator control element 10 or 10A in direction 61 by a first distance, which is denoted by reference symbol 62, to preselect an adjacent left-hand list entry in a list presented by means of the display 4. Such a list is shown in FIG. 12, for example. If the operator control element 10 or the operator control element 10A is displaced by the first distance 62 in direction 61, the selected "Navigation" entry changes to "Media"—as shown in FIG. 13. If the operator control element 10 or the operator control element 10A is displaced by the first distance 62 in direction 61 three times in succession, the selected "Navigation" entry changes to "Setup"—as shown in FIG. 14.

Provision is made for displacement of the operator control element 10 or 10A in direction 65 by a first distance, which is denoted by reference symbol 66, to preselect an adjacent right-hand list entry in a list presented by means of the display 4, as shown in FIG. 12, for example. If the operator control element 10 or the operator control element 10A is displaced by the first distance 66 in direction 65, the selected "Navigation" entry changes to "Internet".

If the operator control element 10 or 10A is displaced by a second distance, denoted by reference symbol 63, in direction 61, the list shown in FIG. 12 is scrolled rapidly to the left, with the actuator 18 of the operator control element 10 or 10A being used to produce haptic feedback. In this case, haptic feedback is first of all produced (click or production of a restoring force when the first distance is exceeded) when the first distance 62 is exceeded. Furthermore, displacement by the second distance 63 during scrolling involves the production of haptic feedback for each entry which is scrolled over (particularly vibration at an appropriate frequency).

If the operator control element 10 or 10A is displaced by a second distance, denoted by reference symbol 67, in direction 65, the list shown in FIG. 12 is scrolled rapidly to the right, the actuator 18 of the operator control element 10 or 10A being used likewise to produce haptic feedback. In this case, haptic feedback is first of all produced (click or production of a restoring force when the first distance is exceeded) when the first distance 66 is exceeded. Furthermore, displacement by the second distance 67 during scrolling involves the production of haptic feedback for each entry which is scrolled over (particularly vibration at an appropriate frequency).

Figure 15:
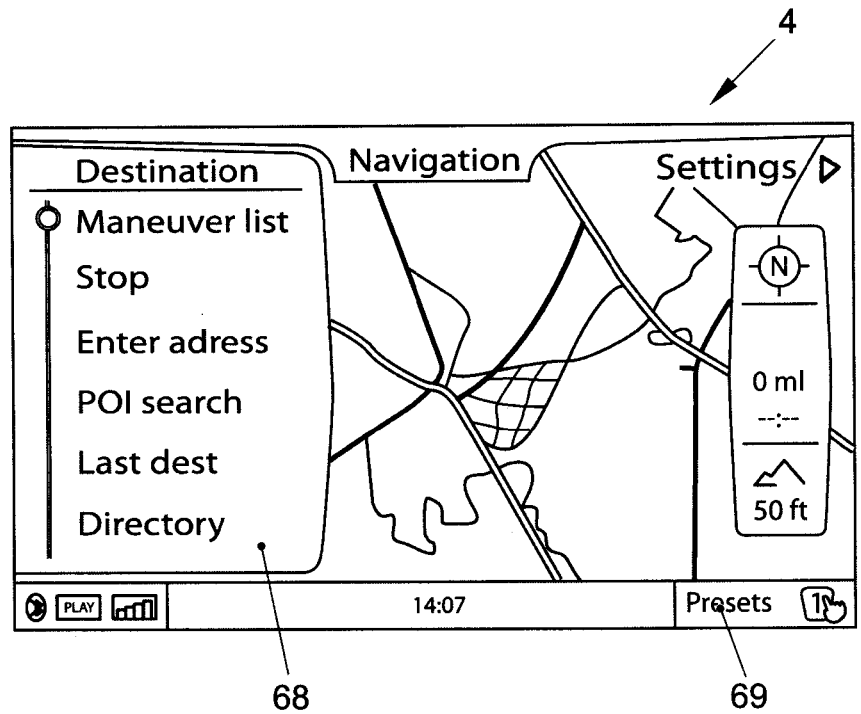
FIG. 15 shows a further exemplary embodiment of an indication by means of a display in the motor vehicle shown in FIG. 1.

If the display 4 is being used to display a map presentation, displacement of the operator control element 10 or 10A in direction 61 opens a selection window denoted by reference symbol 68 by way of example in FIG. 15. By displacing the operator control element in direction 51 or displacing the operator control element 10 or 10A in direction 55, it is possible to scroll through a list presented in the selection window 68. By displacing the operator control element 10 or 10A in direction 65, the selection window 68 can be closed again.

In particular, provision may be made for touching the touch-sensitive lateral edge 12 to cause a current list entry in a list presented by means of the display 4 to be highlighted. By way of example, provision may thus be made for the icons in the list shown in FIG. 12 to be presented in essentially the same size and with the same level of meaning. When the touch-sensitive lateral edge 12 of the operator control element 10 or 10A is touched, provision may be made for the currently preselected or selected "Navigation" icon to be visually highlighted, this being able to be done by virtue of enlarged presentation and/or more intense illumination, for example.

In particular, provision is made for the display 4 to be used to indicate the current function of operator control of the touchpad 11. To this end, a window 69 associated with the touchpad 11 is presented in the lower right-hand corner of the indicator, for example (see FIG. 12, FIG. 13, FIG. 14 and FIG. 15). In the case shown in FIG. 12, FIG. 13, FIG. 14, FIG. 15, the window 69 associated with the touchpad 11 indicates that operator control of the touchpad 11 allows a direct jump to the radio station.

Figure 16:
FIG. 16 shows an exemplary embodiment of a detail from an indication by means of a display in the motor vehicle shown in FIG. 1.
Figure 17:
FIG. 17 shows a further exemplary embodiment of a detail from an indication by means of a display in the motor vehicle shown in FIG. 1.
Figure 18:
FIG. 18 shows a further exemplary embodiment of a detail from an indication by means of a display in the motor vehicle shown in FIG. 1.

If, by way of example, provision is made for the touchpad 11 to be able to be used to input letters or numbers, the window 69 associated with the touchpad 11 is in the form shown in FIG. 16. If, by way of example, provision is made for the touchpad 11 to be able to be used to displace a map, the window 69 associated with the touchpad 11 is in the form shown in FIG. 17. If, by way of example, provision is made for the touchpad 11 to be able to be used to specify letters or to jump to an initial letter, the window 69 associated with the touchpad 11 is in the form shown in FIG. 18.

For the purpose of evaluating the touchpad 11, a touchpad evaluation module 32 is provided in the controller 30. The touchpad evaluation module 32 can be used to sense the position of any touch and the speed thereof and to transmit it to the control module 31.

Figure 19:
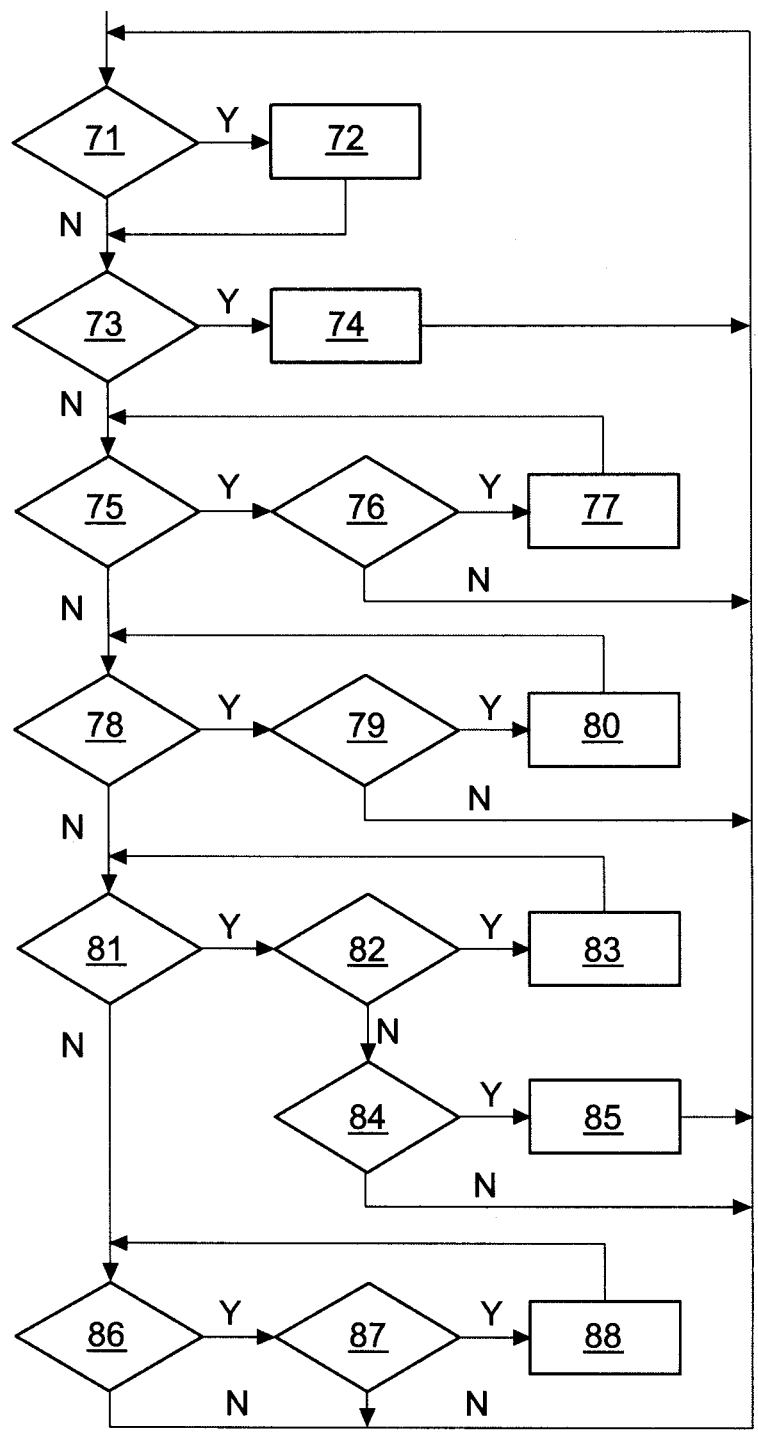
FIG. 19 shows an exemplary embodiment of a method for the operator control of the motor vehicle shown in FIG. 1 with an operator control element as shown in FIG. 2.

FIG. 19 shows a method for the operator control of the motor vehicle 1, which is implemented in the controller 30 or the control module 31. The method begins with a test 71 to determine whether the touch-sensitive lateral edge 12 is being touched. If the touch-sensitive lateral edge 12 is being touched, a currently selected or preselected entry in a list presented by means of the display 4 is highlighted. Otherwise, the test 71 is followed by a test 73 to determine whether the touchpad 11 is being touched or controlled by an operator. Step 72 is also followed by the test 73.

If the touchpad 11 is being touched, the test 73 is followed by a step 74 in which the relevant function currently associated with the touchpad 11 is performed. If the touchpad 11 is not being touched, the test 73 is followed by a test 75 to determine whether the operator control element 10 or 10A has been displaced in direction 51 or 55 by the first distance.

If the operator control element 10 or 10A has been displaced in direction 51 or 55 by the first distance, the test 75 is followed by a test 76 to determine whether the display 4 is being used to present a list. If the display 4 is not being used to present a list, the test 76 is followed by the test 71. If, by contrast, the display 4 is being used to present a list, the upper or lower list entry adjacent to the current list entry is preselected or selected in a step 77. Step 77 is in turn followed by the test 75.

If the operator control element 10 or 10A has not been displaced in direction 51 or 55 by the first distance, the test 75 is followed by a test 78 to determine whether the operator control element 10 or 10A has been displaced in direction 51 or 55 by the second distance. If the operator control element 10 or 10A has been displaced in direction 51 or 55 by the second distance, the test 78 is followed by a test 79 to determine whether the display 4 is being used to present a list. If the display 4 is not being used to present a list, the test 79 is followed by the test 71. If, by contrast, the display 4 is being used to present a list, the list presented by means of the operator control element 4 is scrolled upward or downward in a step 80. Step 80 is followed by the test 78.

If the operator control element 10 or 10A has not been displaced in direction 51 or 55 by the second distance, the test 78 is followed by a test 81 to determine whether the operator control element 10 or 10A has been displaced in direction 61 or 65 by the first distance. If the operator control element 10 or 10A has been displaced in direction 61 or 65 by the first distance, the test 81 is followed by a test 82 to determine whether the display 4 is being used to present a list. If the display 4 is being used to present a list, the left-hand or right-hand list entry adjacent to the current list entry is preselected or selected in a step 83. Step 83 is in turn followed by the test 81. If the display 4 is not being used to present a list, the test 82 is followed by a test 84 to determine whether the display 4 is being used to display a map presentation. If the display 4 is being used to display a map presentation, the test 84 is followed by a step 85, in which a selection window, as denoted by reference symbol 68 by way of example in FIG. 15, is opened or closed. Step 85 is followed by the test 71. If the display 4 is not being used to present a map presentation, the test 84 is followed by the test 71.

If the operator control element 10 or 10A has not been displaced in direction 61 or 65 by the first distance, the test 81 is followed by a test 86 to determine whether the operator control element 10 or 10A has been displaced in direction 61 or 65 by the second distance. If the operator control element 10 or 10A has been displaced in direction 61 or 65 by the second distance, the test 86 is followed by a test 87 to determined whether the display 4 is being used to present a list. If the display 4 is not being used to present a list, the test 87 is followed by the test 71. If, by contrast, the display 4 is being used to present a list, the list presented by means of the operator control element 4 is scrolled to the left or to the right in a step 88. Step 88 is followed by the test 86.

The invention claimed is:

1. A motor vehicle having an operator control element for operator control of functions of the motor vehicle, said operator control element comprising:

a surface including a touchpad that enables the operator to control at least a first function of the motor vehicle, wherein when the operator control element is displaced in a first direction parallel to the a plane in which the surface is positioned, the operator control element controls at least a second function of the motor vehicle, wherein the touchpad moves relative to a surface of an operator control cluster in the motor vehicle in more than two directions parallel to the plane in which the surface is positioned, wherein displacing the operator control element by a first distance in the first direction enables operator control of the second function of the motor vehicle, and displacing the operator control element by a second distance in the first direction enables operator control of at least a third function of the motor vehicle, and wherein the second distance is greater than the first distance in the first direction and the first and second distances are distances away from an initially located center of the touchpad.

2. The motor vehicle of claim 1, wherein the motor vehicle further comprises a display which is physically separate from the operator control element.

3. The motor vehicle of claim 2, wherein the second function of the motor vehicle comprises a jump from a marked list entry presented by the display to an adjacent list entry presented by the display.

4. The motor vehicle of claim 3, wherein the third function of the motor vehicle comprises scrolling through a list presented by the display.

5. The motor vehicle of claim 4, wherein a speed of scrolling through the list presented by the display is dependent on the second distance.

6. The motor vehicle of claim 2, wherein the third function of the motor vehicle comprises scrolling through a list presented by the display.

7. The motor vehicle of claim 6, wherein a speed of scrolling through the list presented by the display is dependent on the second distance.

8. The motor vehicle of claim 6, wherein the motor vehicle further comprises a controller for producing haptic feedback when a list entry in the list is reached.

9. The motor vehicle of claim 2, wherein the first function of the motor vehicle is indicated by the display.

10. The motor vehicle of claim 1, wherein the motor vehicle further comprises a controller for producing haptic feedback when the first distance is exceeded.

11. The motor vehicle of claim 1, wherein displacement of the operator control element in another direction parallel to the plane in which the surface is provided enables the operator control element to control at least a fourth function of the motor vehicle.

12. The motor vehicle of claim 1, wherein displacement of the operator control element in another direction parallel to the plane in which the surface is provided enables the operator control element to control at least a third function of the motor vehicle.

13. The motor vehicle of claim 1, wherein the operator control element further comprises an edge protruding upward beyond the touchpad and delimiting the touchpad.

14. The motor vehicle of claim 1, wherein the touchpad moves relative to the surface of the operator control cluster in the motor vehicle in four directions parallel to the plane in which the surface is positioned.

15. The motor vehicle of claim 1, wherein when the operator control element is displaced by the second distance in the first direction a corresponding list display on a display is rapidly scrolled through.

16. The motor vehicle of claim 15, wherein haptic feedback is output via the operator control element for each entry which is scrolled over when the operator control element is displaced by the second distance.

17. The motor vehicle of claim 16, wherein the haptic feedback is output for each scrolled over entry is a vibration at an appropriate frequency.

18. A method for the operator control of a motor vehicle with an operator control element, wherein the operator control element comprises a surface having a touchpad the method comprising:
receiving operator control of at least a first function of the motor vehicle by touch to the touchpad; and
receiving operator control of at least a second function of the motor vehicle by displacement of the operator control element by a first distance in a first direction parallel to a plane in which the touchpad is positioned,
wherein the touchpad moves relative to a surface of an operator control cluster in the motor vehicle in more than two directions parallel to the plane in which the surface is positioned,
wherein the method further comprises receiving operator control of at least a third function of the motor vehicle by displacement of the operator control element by a second distance in the first direction parallel to the plane in which the touchpad is positioned, and
wherein the second distance is greater than the first distance in the first direction and the first and second distances are distances away from an initially located center of the touchpad.

19. The method of claim 18, the method further comprising outputting indication of the first function of the motor vehicle by a display which is physically separate from the operator control element.

20. The method of claim 18, the method further comprising outputting an indication of the first function of the motor vehicle by a display which is physically separate from the operator control element.

21. The method of claim 18, the method further comprising producing haptic feedback when the first distance is exceeded.

22. The method of claim 21, wherein the third function of the motor vehicle comprises scrolling through a list presented by a display which is physically separate from the operator control element, and wherein the method further comprises producing haptic feedback when a list entry in the list is reached.

23. The method of claim 18, wherein the third function of the motor vehicle comprises scrolling through a list presented by a display which is physically separate from the operator control element, and wherein the method further comprises production of haptic feedback when a list entry in the list is reached.

24. The method of claim 18, wherein the touchpad moves relative to the surface of the operator control cluster in the motor vehicle in four directions parallel to the plane in which the surface is positioned.

25. The method of claim 18, wherein when the operator control element is displaced by the second distance in the first direction a corresponding list displayed on a display is rapidly scrolled through.

26. The method of claim 25, wherein haptic feedback is output via the operator control element for each entry which is scrolled over when the operator control element is displaced by the second distance.

27. The method of claim 26, wherein the haptic element is output for each scrolled over entry is a vibration at an appropriate frequency.

28. An operator control element configured to enable operator control of functions of a motor vehicle, the operator control element comprising:
a surface including a touchpad that enables the operator to control at least a first function of the motor vehicle, wherein when the operator control element is displaced in a first direction parallel to a plane in which the surface is positioned, the operator control controls at least a second function of the motor vehicle,
wherein the touchpad moves relative to a surface of an operator control cluster in the motor vehicle in more than two directions parallel to the plane in which the surface is positioned,
wherein displacement of the operator control element by a first distance in the first direction enables operator control of the second function of the motor vehicle, and displacement of the operator control element by a second distance in the first direction allows operator control of at least a third function of the motor vehicle, and
wherein the second distance is greater than the first distance in the first direction and the first and second distances are distances away from an initially located center of the touchpad.

29. The operator control element of claim 28 in combination with a display which is physically separate from the operator control element, and wherein the second function of the motor vehicle comprises a jump from a marked list entry presented by the display to an adjacent list entry presented by the display.

30. The operator control element in combination with the physically separate display of claim 29, wherein the third function of the motor vehicle comprises scrolling through a list presented by the display.

31. The operator control element in combination with the physically separate display of claim 30, wherein a speed of scrolling through the list presented by the display is dependent on the second distance.

32. The operator control element in combination with the physically separate display of claim 29, wherein the first function of the motor vehicle is indicated by the display.

33. The operator control element in combination with the physically separate display of claim 29, in further combination with a controller for producing haptic feedback when the first distance is exceeded.

34. The operator control element in combination with the physically separate display of claim 29, in further combination with a controller for producing haptic feedback when a list entry in the list is reached.

35. The operator control element of claim 28, wherein displacement of the operator control element in another direction parallel to the plane in which the surface is provided enables the operator to control at least a fourth function of the motor vehicle.

36. The operator control element of claim 28, wherein displacement of the operator control element in another direction parallel to the plane in which the surface is provided enables the operator to control at least a third function of the motor vehicle.

37. The operator control element of claim 28, wherein the operator control element further comprises an edge protruding upward beyond the touchpad and delimiting the touchpad.

38. The operator control element of claim 28, wherein the touchpad moves relative to the surface of the operator control cluster in the motor vehicle in four directions parallel to the plane in which the surface is positioned.

39. The operator control element of claim 28, wherein when the operator control element is displaced by the second distance in the first direction a corresponding list display on a display is rapidly scrolled through 40. The operator control element of claim 39, wherein haptic feedback is output via the operator control element for each entry which is scrolled over when the operator control element is displaced by the second distance.

41. The operator control element of claim 40, wherein the haptic feedback is output for each scrolled over entry is a vibration at an appropriate frequency.

* * * * *